No. 706,951. Patented Aug. 12, 1902.
M. E. JOHNSON.
HARROW.
(Application filed Feb. 14, 1902.)
(No Model.) 3 Sheets—Sheet 1.

Witnesses
H. L. Ames.
Chas. S. Hyer.

Inventor
Morris E. Johnson,
By Victor J. Evans
Attorney

No. 706,951. Patented Aug. 12, 1902.
M. E. JOHNSON.
HARROW.
(Application filed Feb. 14, 1902.)
(No Model.) 3 Sheets—Sheet 2.

No. 706,951. Patented Aug. 12, 1902.
M. E. JOHNSON.
HARROW.
(Application filed Feb. 14, 1902.)
(No Model.) 3 Sheets—Sheet 3.

Witnesses
H. L. Amer.
Chas. S. Hyer.

Inventor
Morris E. Johnson,
By Victor J. Evans
Attorney

UNITED STATES PATENT OFFICE.

MORRIS E. JOHNSON, OF LAUREL, NEBRASKA.

HARROW.

SPECIFICATION forming part of Letters Patent No. 706,951, dated August 12, 1902.

Application filed February 14, 1902. Serial No. 94,088. (No model.)

*To all whom it may concern:*

Be it known that I, MORRIS E. JOHNSON, a citizen of the United States, residing at Laurel, in the county of Cedar and State of Nebraska, have invented new and useful Improvements in Harrows, of which the following is a specification.

This invention relates to harrows constructed with hinged sections to adapt it to be folded into compact form for transportation or storage and also permit it to conform to irregularities in the ground-surface over which it is propelled or dragged, and thereby evenly and regularly treat the ground or break up the soil irrespective of humps or hollows prevalent therein. The improved harrow is also provided with means whereby it may be rendered rigid for use on level ground; but when the parts are free to conform to the irregularities of the ground-surface over which the harrow is moved the movable sections of the latter in riding up over an elevation or hump will cause adjacent parts of the harrow to be forcefully depressed into the adjacent hollows, or vice versa, and in view of this operation the improved harrow is particularly useful as a drag in breaking up clods or lumps or tearing through grass or debris, particularly in cleaning and clearing operations.

The improved harrow also embodies means for adjusting the teeth at different angles to accommodate different operations or conditions of the ground treated, and, furthermore, the several sections can be elevated at any time to clear them of trash which may have become accumulated thereunder and obstructing the operation of the harrow without overturning or elevating the entire device.

The invention consists in the construction and arrangement of the several parts, which will be more fully hereinafter described, subject to a wide range of modification in the form, proportions, dimensions, and minor details.

Figure 1:
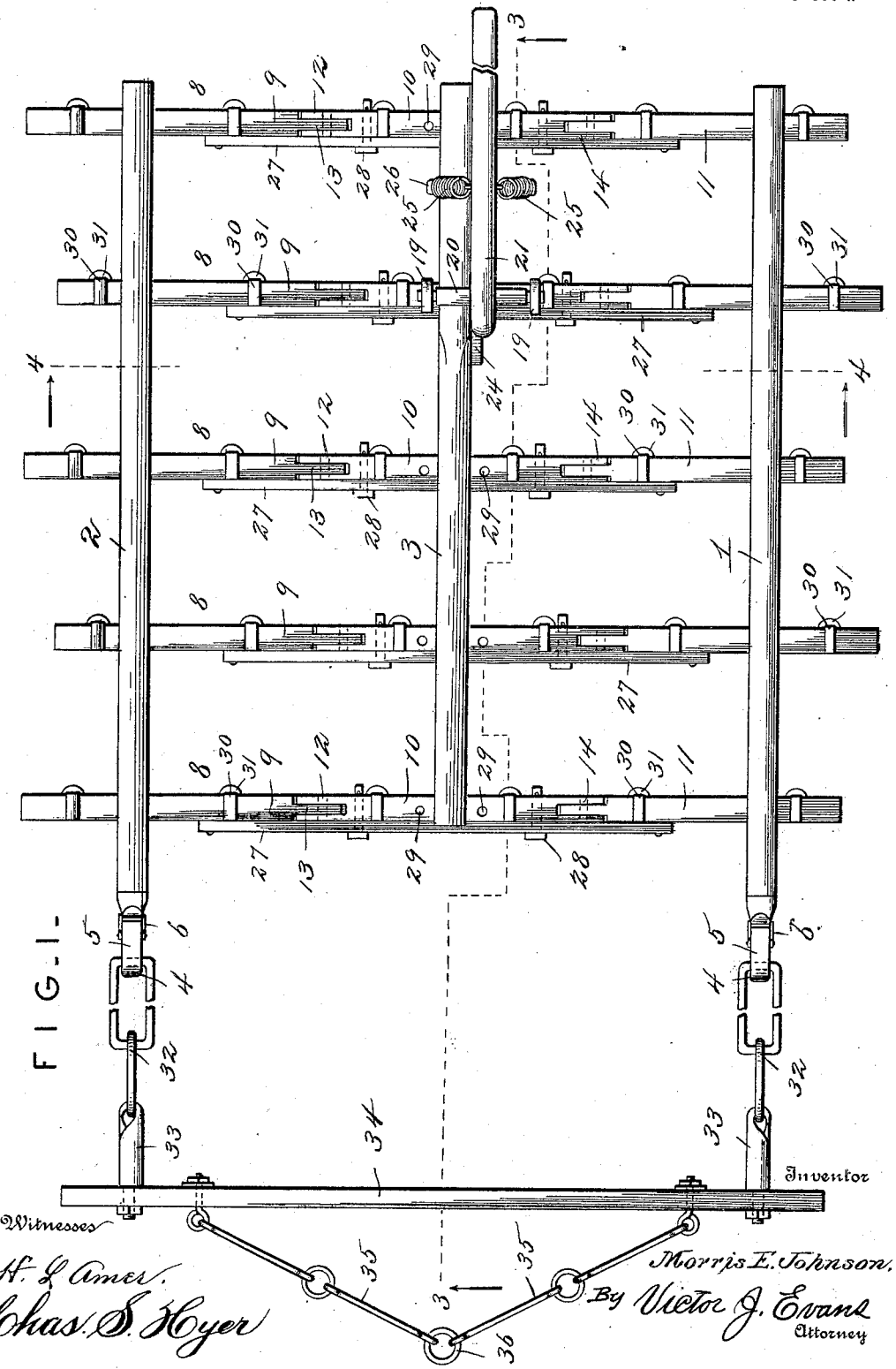
Figure 2:
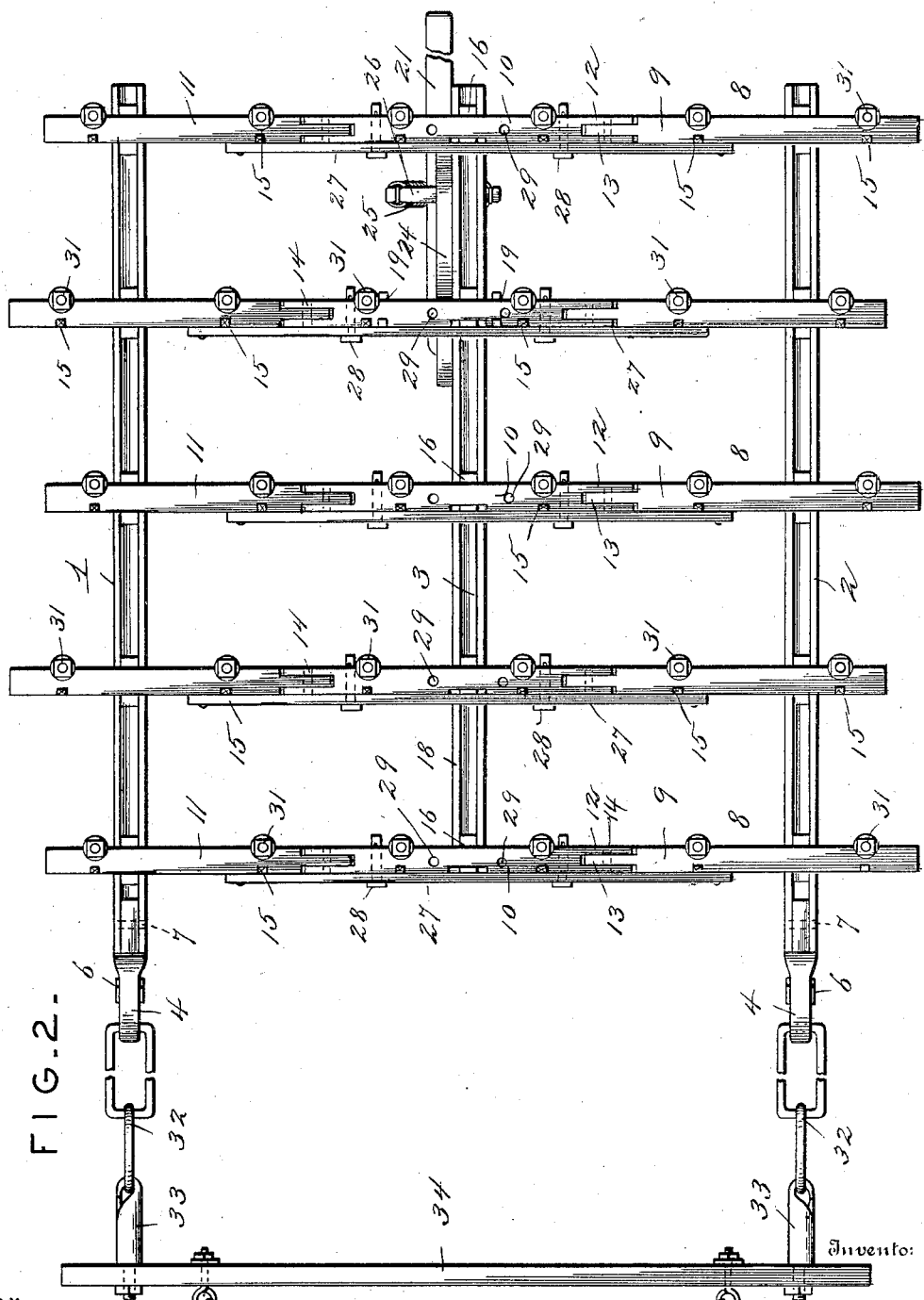
Figure 3:
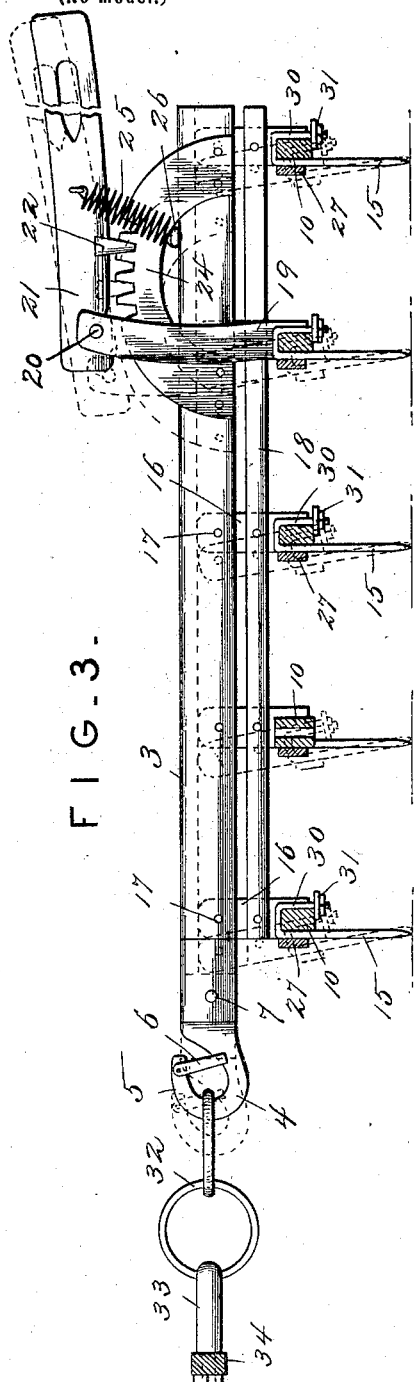
Figure 4:
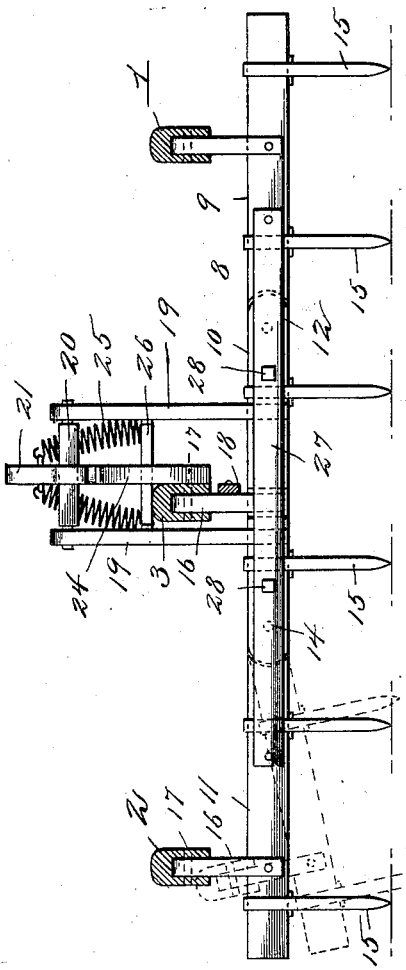
Figure 5:
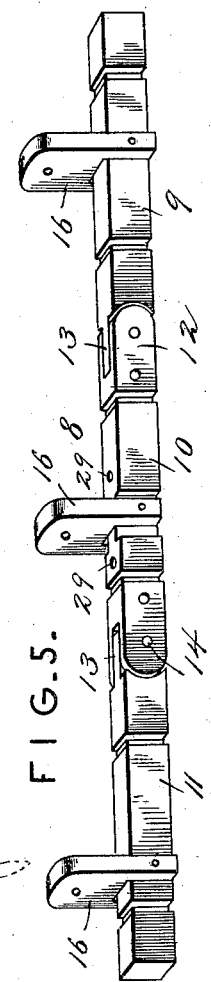

In the drawings, Figure 1 is a top plan view of a harrow embodying the features of the invention. Fig. 2 is a bottom plan view of the same. Fig. 3 is a longitudinal vertical section taken in the plane of the line 3 3 of Fig. 1. Fig. 4 is a transverse vertical section taken in the plane of the line 4 4 of Fig. 1. Fig. 5 is a detail perspective view of one of the sectional and movably-connected tooth-bars.

Similar numerals of reference are employed to indicate corresponding parts in the several views.

The numerals 1, 2, and 3 designate longitudinally-disposed frame-bars, which are preferably formed of U-shaped or channeled material or metal to lighten the same and disposed in such manner that the open sides thereof will be downward. The bars 1 and 2 are longer than the bar 3, which is located at a point centrally of the harrow, and on the forward ends of the said bars 1 and 2 clevises 4 are secured, one on each bar, and comprise outer hooked extremities 5, with gravitating closing-dogs 6 to prevent the accidental disengagement of the connecting-bars which are attached thereto. The rear extremities of the said clevises are fitted within the forward ends of the bars 1 and 2 and held by rivets 7, and in the event of wear of the clevises the rivets are removed and similar substitute devices are applied to the bars 1 and 2 and securely held in place. By this means the harrow as an entirety is prevented from becoming seriously endangered by wear or breakage of the clevises, and the life of the entire device will thus be prolonged.

A plurality of tooth-bars 8 are comprised in the improved harrow construction, and each tooth-bar is made up of three sections 9, 10, and 11, the section 10 being centrally located and having slots 12 in the opposite ends to removably receive tongues 13 on the inner ends of the sections 9 and 11, the said tongues being held in the slots 12 by suitable pivot bolts or pintles 14. The tooth-bars 8 are alternately projected at different distances beyond the outer sides of the bars 1 and 2, so as to bring the teeth 15 in proper alined relation or to have the teeth of each bar in advance of the one next in the rear opposite the spaces between those of the latter. These tooth-bars are pivotally or movably held in relation to the frame-bars 1, 2, and 3, and extending upwardly therefrom are fulcrum-arms 16, which have their upper terminals inclosed within the said frame-bars and connected to the latter by means of pivot-bolts or like devices 17. By pivoting the bars 8 to the frame-bars 1, 2, and 3 the teeth 15 may be adjusted at varying angles, as clearly indicated by dotted lines in Fig. 3, to accommodate certain contingencies or conditions of the ground treated, as will be obvious to those skilled in the art to which the improved device pertains. The adjustment of all the tooth-bars in unison is obtained by attaching a longitudinally-extending connecting-bar 18 to the arms 16 at the center and which are pivoted to the frame-bar 3, the connecting-bar 18 being below the plane of the lower edges of the said bar 3. Rising from the central section 10 of the tooth-bar next to the rearmost one of the series and on opposite sides of the central frame-bar 3 are uprights 19, having the opposite ends of a transverse fulcrum-bar 20 movably mounted in the upper extremities thereof, and to the said fulcrum-bar 20 the forward end of a shifting-lever 21 is attached and supplied with a depending tooth 22 to engage between the teeth of a sector 24, secured to one side of the central frame-bar 3. The shifting-lever 21 is held down in normal position, so that the tooth 22 will be in firm engagement with the teeth of the sector 24 in accordance with the adjustment, by opposite springs 25, connected at their upper terminals to the opposite sides of the lever 21 and at their lower terminals to a cross-bar 26. By shifting the lever 21 either forwardly or backwardly the angle of the teeth and of the bars 8, carrying the same, may be varied at will.

As before explained, the tooth-bars 8 are made up of movable sections to permit them to conform to inequalities or irregularities in the ground-surface over which the harrow is dragged, and thereby effectually comminute or break up the soil or in cleaning operations clear debris or accumulations from humps as well as hollows. Frequently, however, it will be desired to have the tooth-bars remain rigid, particularly when the harrow is drawn over level ground. For this purpose each tooth-bar as an entirety is provided with a locking-bar 27, movably attached at its opposite ends to the front sides of the sections 9 and 11, so that when the several sections are free to move they will not be in the least retarded by the said locking-bar. To lock the sections against movement, however, headed pins 28 are inserted through said locking-bar into suitable openings formed in the sections 10 at opposite sides of the center of the latter, as clearly shown by Figs. 1 and 4. It will be observed that the connection of the locking-bar 27 to the central section 10 prevents movement of the said section relatively to the outer sections 9 and 11 or of the outer sections relatively to the central section. When the harrow is arranged to permit the sections to move to conform to irregularities in the ground-surface, the pins 28 are withdrawn from the locking-bars and are carried through openings 29, extending vertically through the central section 10 or opposite sides of the center, as clearly shown by Fig. 1.

The teeth 15 in the present construction have upper rectangular bent heads 30, which are applied to the sections 9, 10, and 11 of the tooth-bars and are secured in place by nuts and clamping-plates, as at 31, and may be replaced at any time desired in the event of breakage.

The clevises 4 have draft-links 32 secured thereto and also attached to rearwardly-extending coupling-snaps 33, carried by the opposite extremities of a draft-bar 34, to which draft-chains 35 project forwardly and converge toward a connecting-ring 36 for attachment of the harness devices or the like.

The improved form of harrow will be found exceptionally convenient and will facilitate a thorough treatment of the ground-surface over which it is drawn, either to comminute or break up plowed soil or for clearing land of debris or accumulations. The parts are of a strong and durable nature and can be easily handled and adjusted.

Having thus fully described the invention, what is claimed as new is—

1. A harrow comprising frame-bars, a series of tooth-bars each consisting of pivoted sections to adapt it to conform to inequalities of the ground-surface, the said tooth-bars being pivotally suspended from the frame-bars, and means for unitedly shifting the tooth-bars to rock them in relation to the frame-bars to vary the angle thereof and the teeth carried thereby.

2. A harrow comprising a plurality of pivotally-mounted tooth-bars which are adjustable to vary the angle of the teeth thereof relatively to the ground-surface, each of the said bars being made up of a series of pivoted sections and adapted to conform to irregularities in the contour of the ground-surface, and means for locking each tooth-bar to prevent the sections thereof from moving.

3. A harrow comprising a plurality of tooth-bars composed of pivoted sections, a locking-bar applied to each tooth-bar and pivoted at opposite extremities to the outer sections of said tooth-bar, and pins for insertion through the locking-bar and the intermediate section of the tooth-bar to prevent the sections of the latter from moving.

4. A harrow comprising a series of frame-bars, a plurality of tooth-bars pivotally suspended from the frame-bars, the said tooth-bars being composed of movable sections, means for adjusting all of the tooth-bars simultaneously to vary the angle of the teeth thereof relatively to the ground-surface, and means for locking the sections of the individual tooth-bars to prevent movement thereof.

In testimony whereof I affix my signature in presence of two witnesses.

MORRIS E. JOHNSON.

Witnesses:
B. J. EVERS,
C. D. YOUNG.